April 17, 1934.  E. SEPPELER  1,955,688
VARIABLE PITCH SCREW
Filed Feb. 1, 1932
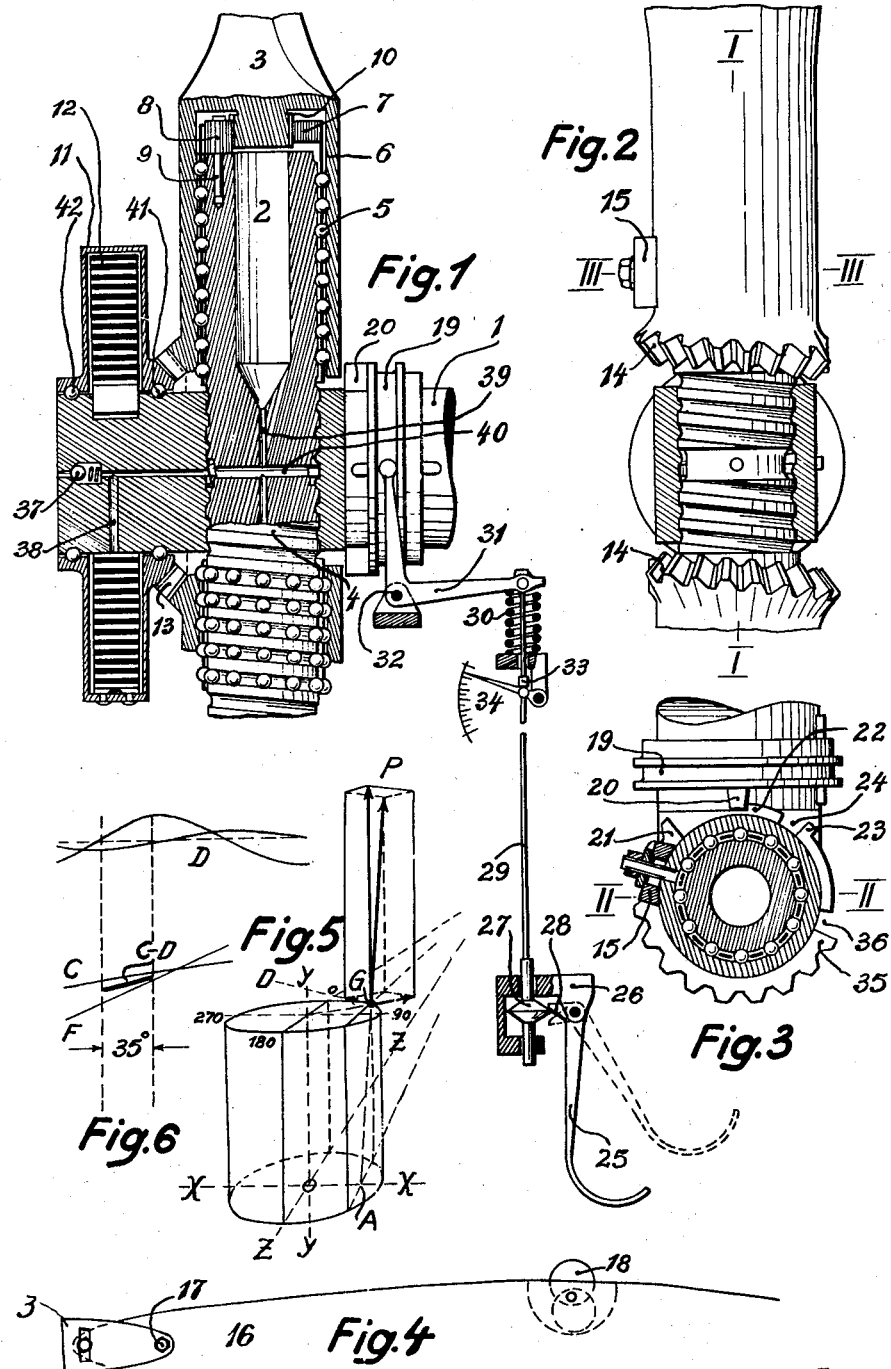
Inventor Patented Apr. 17, 1934

1,955,688

UNITED STATES PATENT OFFICE 1,955,688

VARIABLE PITCH SCREW

Eduard Seppeler, Berlin-Neukolln, Germany

Application February 1, 1932, Serial No. 590,149
In Germany January 16, 1929

8 Claims. (Cl. 170—162)

The purpose of the present invention is to suit the position of the blades of air and water screws—whether expending energy on or receiving energy from the fluid—to the conditions of operation imposed by the fluid in such fashion that the speed of the motor or of the machine driven is kept within the optimum limits for power transfer.

This purpose is achieved by mounting a weight on the blade spindles eccentrically to their axes about which they are rotatable; this weight on the one hand opposes the tendency of the blade to set itself at zero pitch, and on the other hand co-operates with other members in the regulation of the screw on the principle of a centrifugal governor.

According to a further feature of the invention a screw working on this principle is made by screwing the blade spindles on dowels transverse to the hub, so that they turn as they move axially, and the centrifugal force produces a torque which together with the torque component produced by the eccentric weight is opposed by a spring. The tendency of the centrifugal force is to increase the pitch and therefore the power, while the spring tends to lessen the pitch and the power. In order that the forces utilized may not be too large it is desirable to keep the pitch of the thread of the blade spindles and the dowels small; the threads are formed as helical grooves filled with balls or rollers to reduce friction. Such a helical ball or roller bearing permits free operation of the forces even when the pitch is quite small.

According to a further feature of the invention the opposing or return spring is a spiral or helical spring surrounding the axis of the hub. The reason for using such a spring which is wholly stressed in torsion is that it lends itself to convenient construction better than tension or compression springs. For in order to give a sufficiently flat curve of torque the return spring must have considerable initial torsion, since the torque curve resulting from centrifugal force on the blade is also very flat within the range of regulation.

Further features of the invention are concerned with the connection of the return spring with the blades, with the arrangement of the balls or rollers in a cage, and with the kinematically correct guiding of this cage.

According to yet another feature of the invention the torque characteristic produced by the centrifugal force on the blade can be modified by displacement of the centre of pressure on the blade surface relatively to the axis of the blade.

Yet other features of the invention relate to abutments which limit the range of regulation of the air and water screw during working, and to abutments and locking means for holding the blade in braking or retrograde position, and for setting the blade in the position of infinite pitch.

Finally the invention includes reliable means for lubricating all the relatively moving parts of the screw.

The invention is illustrated in the accompanying drawing, which shows as an example of it a two-bladed aircraft propeller, which is automatically set in braking or retrograde position by a mechanical ground feeder.

Figure 1 shows the hub of the propeller and the blade spindle in longitudinal section, and the actuation of the reversing means by a mechanical ground feeler;

Figure 2 is a section on the line II—II of Figure 3, the threaded dowel and the propeller shaft not being shown in section;

Figure 3 is a section on the line III—III of Figure 2, the spring casing and the front part of the propeller shaft being omitted;

Figure 4 shows two means for displacing the centre of pressure on the blade surface;

Figure 5 is a three dimensional perspective diagram of the forces acting on an added weight eccentrically mounted on a blade;

Figure 6 illustrates the modification of the torque curve resulting from centrifugal force on the blade by the torque curve of an added weight.

In the hub 1 there is fastened a threaded dowel 2 upon which the two blade spindles 3 are screwed; in order that the blades may turn readily the screw connection is formed by balls 5 running in grooves 4. The balls 5 are held together by cages 6; these should be positively rotated to the extent necessary to ensure pure rolling of the balls on both races; in the construction illustrated kinematically correct guidance for satisfactory operation is imparted to these cages by the provision of internal teeth 7 upon them which mesh with one of a pair intermeshing pinions 8 freely revoluble on spindles 9 set in the dowels 2, the second pinion 8 in turn meshing with gear wheels 10 on the blade spindles 3. The number of teeth in the internal ring 7 and the wheel 10 should be approximately in the ratio $$\frac{R+r}{R},$$

where R is the diameter of the outer ball race and $r$ that of the inner. The essential thing about any such arrangement is the kinematically correct coupling of the threaded dowel 2 with the blade 3 and the cage 7.

Variation of blade pitch under centrifugal forces is opposed by a spring resistance acting equally on all the blades. In the drawing *a* return spring 12 anchored at one end to the hub and at the other to a spring casing 11 is connected with the blade spindles 3 by a bevel gear 13 and two helical bevelled segments 14.

In operation a torque proportional to the centrifugal force on the blade tends to screw the blade outward until it is opposed by an equal torque produced by the winding of the spring 12.

The torque resulting from the centrifugal force on the blade increases, like the centrifugal force itself, with the square of the angular velocity. In Figure 6 this torque is plotted in co-ordinates of which the abscissæ represent the turning of the blade in degrees of arc and the ordinates the torque. The result is a curve C which within the range of regulation is very flat. The curve of spring torque is a straight line indicated in Figure 6 by F. The intersection of C and F gives the maximum speed of rotation. To obtain sensitive regulation it is desirable that C and F should make as small an angle as possible. The invention provides for correcting or modifying the curve C within the range of regulation by the mounting of a weight on the blades eccentric to the axis on which they turn. In Figures 2 and 3 such an added weight 15 is rotatable about the axis of the blade and can be clamped in position. Figure 5 shows in three dimensional perspective how such a mass causes the blade to turn. In this Figure X—X is the axis of revolution of the propeller, Y—Y the axis on which the blade turns, and Y—O—Z the plane of rotation of the blade axis. A weight G eccentrically mounted on the blade spindle rotates in a plane parallel to Y—O—Z; this plane is indicated in Figure 5 by its intersections with the blade spindle, with the plane X—O—Z and with a plane passing through G at right angles to the Y axis. The centrifugal force P due to the mass G is in this plane and is directed outward from the point of intersection A of the X axis with the plane of rotation of the point G. The component D of this force in the plane at right angles to the Y axis which alone affects regulation is obtained by resolving the force P in the directions of the edges of a rectangular parallelopiped. This torque producing force D is zero at the point O and at points 90°, 180° and 270° from it; since the parallelopiped of force reduces to a rectangle in the plane Y—O—Z at the points O and 180 and to a straight line P at the points 90 and 270. In the upper part of Figure 6 are shown the torque curves of two different weights, the curves being displaced in phase from each other. These forces vary as the weight is moved around the blade axis according to a sine law. The part of the sine curve above the zero line causes the blade to turn anti-clockwise, the part below the zero line causes it to turn clockwise. Since the amplitude of these curves can be determined by proper choice of the weight, and their phase displacement by proper choice of the position of the weight, it is easy to correct the curve C within the range of regulation of 35° by addition or subtraction of an appropriate D curve. In Figure 6 the C curve is corrected by the corresponding part of the flatter of the D curves, and there results a characteristic C—D for the screw regulator which in its upper part shows the desired form of a pseudo-astatic regulator.

All masses in the propeller blade out of the plane of rotation of its axis act in the same way as the mass 15; the normal distribution of these masses gives rise to a torque which opposes the torque resulting from the total centrifugal force on the blade, and disturbs its action. Its disturbing effect can be obviated by the use of added eccentric weights like the weight 15.

Torques adding to or opposing that due to centrifugal force may also be obtained without the use of added weights by displacing to an eccentric position the centre of pressure on the blade surface. In Figure 4 two schemes for this purpose are shown by way of example. On the left of the figure the blade 16 is shown as rotatable about a pin 17 in the propeller shaft 3, the tail of the blade being adjustable in a slot in the propeller shaft. Quite minute adjustments of the axis of the blade relatively to the axis of the blade spindle greatly modify the torque resulting from the air and water pressure. On the right of Figure 4 is shown a means by which a comparatively coarse adjustment can be made to produce slight variations in the action of these forces. A flat circular disc 18 is eccentrically mounted in a recess in the blade 16. The disc is shown in full lines in the position of maximum effect; in the dotted line position its effect is nil.

Figure 3 shows how the range of regulation of the propeller to the conditions under which it works is limited by the aid on the one hand of a sleeve 19 movable lengthwise relatively to the axis of the propeller but not rotatable about it, with two lugs 20, 180° apart, and on the other hand of abutments 21 and 22 on the blade spindle. Figure 3 shows the position of minimum pitch and therefore of least power.

To obtain a braking action, and, if desired, to enable the aircraft to run backward after landing, the sleeve 19 must be shifted so that the abutment 22 passes under the lug 20, and until the abutment 23 strikes the lug. By engaging the lug in the recess 24 the full power of the engine may be employed for braking or running backward.

Braking of the aircraft on nearing the ground after the engine has been throttled down can be effected automatically by providing a feeler to effect the reversal of the propeller either directly or through a relay. Such feeler may be mechanical, for instance it may be a feeler lever or the suitably mounted under-carriage, or a trailing rope or the like, or it may be a feeler actuated at a distance by acoustic or electric means or by gravitation.

As an example of such constructions Figure 1 shows a ground feeler 25 which is pivoted in a bracket 26 upon the aircraft. When the feeler meets the ground its nose 28 presses down a cone 27 slidable in bracket 26, and through the medium of a pull-rod 29 turns the bell crank lever 31 about its fixed pivot 32 against the action of spring 30, so that the sleeve 19 is moved so far to the right that the abutment 22 passes the lug 20 (see Fig. 3). Under the action of spring 30 the lug 20 moves into the recess 25 and holds the propeller in retrograde position. On the downward movement of the pull-rod 29 a projection 33 on the rod temporarily moves the lever 24, controlling the carburetter throttle valve, downwards, thereby closing this throttle valve and bringing the motor to idling speed; the lug 28 mounted on the ground feeler 25 will slide off the double cone 27 when the feeler rises so that the rod 29, under the action of the spring 30, can move up again and the throttle lever 34 will assume the position of full load, which, however, owing to the inertia of the motor, does not take effect before the lug 20 has snapped into the recess 24.

The application of this principle of reversal in its manifold possible means of actuation is of importance not only in aircraft but also in ships, which can be braked by feelers of mechanical construction, or acoustic or thermal feelers acting at a distance, in time to avoid shallows, reefs and icebergs.

In aircraft with several engines the failure of an engine which is not in the principal axis of the aircraft is doubly disturbing on account of the lopsided air resistance. Such harmful resistance of the out-of-action engine unit may be obviated by setting the propeller at infinite pitch so that it offers minimum air resistance.

From Figure 3 may be seen how upon the sleeve 19 being sufficiently shifted the abutment 23 passes the lug 20, and the blade can turn under the action of the spring until the lug 20 and abutment 35 meet; it can be locked in the desired position by the snapping of lug 20 into the recess 36.

To ensure free play of the screw regulator care must be taken that the lubrication is adequate. According to the invention this is simply done by distributing the lubricant supplied through the ball valve 37 through channels 38, 39 and 40 in such fashion that the lubricant can reach the parts nearer the axis of the propeller, as the ball bearings 41, 42 and the bevel wheels 13 and 14, only after lubricating the parts more distant from the propeller axis.

I claim:

1. A variable pitch screw for conveying energy to and from a fluid comprising a hub, blades having threaded engagement with said hub and freely rotatable therein, spring means acting between said blade and said hub opposing the torque arising from centrifugal force upon the blades and their threaded engagement with the hub, an adjustable mass on each blade variable in position relatively to the axis of the blade thread and means for clamping said mass in adjusted position.

2. A variable pitch screw for conveying energy to and from a fluid comprising a hub, blades having threaded engagement with said hub and freely rotatable therein, spring means acting between said blade and said hub opposing the torque arising from centrifugal force upon the blades and their threaded engagement with the hub, an adjustable mass on each blade offset from the axis of the blade thread so that the centrifugal force upon it tends to increase the pitch of the blade, and means for clamping said mass in adjusted position.

3. A variable pitch screw for conveying energy to and from a fluid comprising a hub with radial helically grooved blade supports, blades with helically grooved spindles, rolling bodies engaging in the grooves of both the blade supports and the blade spindles, cages retaining said rolling bodies in fixed relative position, means for positively turning said cages in conformity with relative movement of said blades and the hub, and spring means acting between said spindles and said hub opposing the torque on the blade spindles due to centrifugal force.

4. A variable pitch screw for conveying energy to and from a fluid comprising a hub, blades having threaded engagement with said hub, an adjustable auxiliary surface member on each blade movable to alter the position of the centre of pressure on the blade, and spring means acting between said blades and said hub to determine in conjunction with the centrifugal force and the fluid pressure the pitch of the blades.

5. A variable pitch screw propeller comprising a hub, blades having threaded engagement with said hub forming a positive driving connection and freely rotatable therein, said threaded engagement causing the pitch of the blades to increase as they move radially outward, spring means acting between said blades and the hub tending to diminish the pitch of the blades, and means for locking said blades in a reverse position.

6. In an aircraft the combination of a variable pitch screw propeller, pitch varying mechanism for automatically increasing and decreasing the pitch of said propeller according to the rate of rotation, abutments for limiting the normal range of adjustment of said propeller, an abutment for arresting said pitch varying mechanism at a reverse position, means for rendering said limiting and arresting abutments inoperative, and an abutment for arresting said pitch varying mechanism at the position of infinite pitch.

7. An automatic air or water screw with rotatable blades for expending energy on or taking energy from a fluid, comprising weights fixed on the blade spindles eccentric to the axis on which the blades rotate, the torque component produced by such weights serving to compensate disturbing torques arising from the shape and position of the blade, and in combination with other forces to make the screw system a centrifugal governor, the blades themselves producing the adjusting power and the weights serving to adapt the adjustment curve to the particular conditions for the adjustment procedure.

8. An automatic air or water screw propeller for expending energy on or taking energy from a fluid, comprising blades having a helical mounting adapted to turn under the action of centrifugal force upon the blades, spring means tending to lessen the blade pitch, and weights mounted eccentrically on the blades relatively to the axis of the blade spindle, the torques due respectively to the centrifugal force upon the entire weight of the blade and the weight itself combining to increase the pitch.

EDUARD SEPPELER.